(12) United States Patent
Florek et al.

(10) Patent No.: US 8,799,084 B2
(45) Date of Patent: Aug. 5, 2014

(54) ELECTRONIC PAYMENT APPLICATION SYSTEM AND PAYMENT AUTHORIZATION METHOD

(75) Inventors: Miroslav Florek, Bratislava (SK); Michal Masaryk, Bratislava (SK)

(73) Assignee: Logomotion, S.R.O. (SK)

( * ) Notice: Subject to any disclaimer, the term of this patent is extended or adjusted under 35 U.S.C. 154(b) by 517 days.

(21) Appl. No.: 12/746,867

(22) PCT Filed: Sep. 18, 2009

(86) PCT No.: PCT/IB2009/054101
§ 371 (c)(1),
(2), (4) Date: Jun. 8, 2010

(87) PCT Pub. No.: WO2010/032216
PCT Pub. Date: Mar. 25, 2010

(65) Prior Publication Data
US 2010/0274677 A1    Oct. 28, 2010

(30) Foreign Application Priority Data
Sep. 19, 2008   (SK) .................................. 5086-2008

(51) Int. Cl.
*G06Q 20/00* (2012.01)
(52) U.S. Cl.
USPC ............................................................ 705/16
(58) Field of Classification Search
USPC ............................................................ 705/16
See application file for complete search history.

(56) References Cited

U.S. PATENT DOCUMENTS

| 5,574,470 A | 11/1996 | de Vall |
| 5,608,417 A | 3/1997 | de Vall |
| 6,062,472 A | 5/2000 | Cheung |

(Continued)

FOREIGN PATENT DOCUMENTS

| CN | 1450782 | 10/2003 |
| CN | 1627321 | 6/2005 |

(Continued)

OTHER PUBLICATIONS

"EMV Mobile Contactless Payment: Technical Issues and Position Paper", www.emvco.com/mobile.aspx, © Oct. 11, 2007, accessed Apr. 20, 2009, 37 pages.

(Continued)

*Primary Examiner* — Seye Iwarere
(74) *Attorney, Agent, or Firm* — Baker & Hostetler LLP

(57) ABSTRACT

The system contains a virtual POS terminal's unit in the user's personal device. The mobile communication device (1) contains a virtual POS terminal's unit (4) and also a removable memory card (3), on which there are at least two physically separate secure elements (2) stored. The removable memory card (3) is connected to the secure element (2) containing the secured part of the virtual POS terminal. The mobile communication device (1) and/or the separate portable element (6) is adjusted in such a way to be able to connect to a remote payment procession server. The removable memory card (3) and the separate portable element (6) can be equipped with the NFC communication element. Depending on the user choice, a corresponding secure element (2) with the selected payment card unit (14) is activated on the removable memory card (3). The user's payment card's identification data are supplemented by the payment receiver's identification data and also by a one-time password that was created in the one-time password unit.

20 Claims, 2 Drawing Sheets

(56) References Cited

U.S. PATENT DOCUMENTS

| | | |
|---|---|---|
| 6,070,795 A | 6/2000 | Feiken |
| 6,070,796 A | 6/2000 | Sirbu |
| 6,450,407 B1 | 9/2002 | Freeman et al. |
| 6,615,243 B1 | 9/2003 | Meggeid et al. |
| 6,745,935 B1 | 6/2004 | Grieu et al. |
| 6,828,670 B2 | 12/2004 | Hayana et al. |
| 6,976,011 B1 | 12/2005 | Capitant et al. |
| 7,103,575 B1 | 9/2006 | Linehan |
| 7,357,309 B2 | 4/2008 | Ghosh et al. |
| 7,364,092 B2 | 4/2008 | Narendra et al. |
| 7,374,100 B2 | 5/2008 | Jei et al. |
| 7,436,965 B2 | 10/2008 | Sherman |
| 7,458,518 B2 | 12/2008 | Fukuda et al. |
| 7,481,358 B2 | 1/2009 | Honjo et al. |
| 7,568,065 B2 | 7/2009 | D'Athis |
| 7,581,678 B2 | 9/2009 | Narendra et al. |
| 7,689,932 B2 | 3/2010 | Maktedar |
| 7,775,442 B2 | 8/2010 | Saarisalo |
| 7,775,446 B2 | 8/2010 | Ochi et al. |
| 7,805,615 B2 | 9/2010 | Narendra et al. |
| 7,828,214 B2 | 11/2010 | Narendra et al. |
| 8,055,184 B1 | 11/2011 | DiMartino et al. |
| 8,127,999 B2 | 3/2012 | Diamond |
| 8,355,670 B2 | 1/2013 | White |
| 2001/0005832 A1 | 6/2001 | Cofta et al. |
| 2002/0038287 A1 | 3/2002 | Villaret et al. |
| 2002/0062249 A1 | 5/2002 | Iannacci |
| 2002/0147658 A1 | 10/2002 | Kwan |
| 2002/0163479 A1 | 11/2002 | Lin |
| 2003/0055738 A1 | 3/2003 | Alie |
| 2003/0138135 A1 | 7/2003 | Chung et al. |
| 2004/0019564 A1 | 1/2004 | Goldthwaite et al. |
| 2004/0066278 A1 | 4/2004 | Hughes et al. |
| 2004/0087339 A1* | 5/2004 | Goldthwaite et al. ......... 455/558 |
| 2004/0127256 A1* | 7/2004 | Goldthwaite et al. ......... 455/558 |
| 2005/0072595 A1 | 4/2005 | Cho |
| 2005/0092835 A1 | 5/2005 | Chung et al. |
| 2005/0116050 A1 | 6/2005 | Jei et al. |
| 2005/0125745 A1 | 6/2005 | Engestrom |
| 2005/0222949 A1 | 10/2005 | Inotay et al. |
| 2005/0269401 A1 | 12/2005 | Spitzer et al. |
| 2005/0269402 A1 | 12/2005 | Spitzer et al. |
| 2006/0083955 A1 | 4/2006 | Kanouda et al. |
| 2006/0143578 A1 | 6/2006 | Maktedar |
| 2006/0146023 A1 | 7/2006 | Kidron |
| 2006/0152288 A1 | 7/2006 | Peng et al. |
| 2006/0186209 A1 | 8/2006 | Narendra et al. |
| 2006/0219776 A1* | 10/2006 | Finn ........................... 235/380 |
| 2006/0224470 A1 | 10/2006 | Garcia et al. |
| 2006/0226217 A1 | 10/2006 | Narendra et al. |
| 2006/0255160 A1 | 11/2006 | Winkler |
| 2007/0014407 A1 | 1/2007 | Narendra et al. |
| 2007/0014408 A1 | 1/2007 | Narendra et al. |
| 2007/0016957 A1 | 1/2007 | Seaward et al. |
| 2007/0050871 A1* | 3/2007 | Mashhour ................... D14/383 |
| 2007/0083772 A1* | 4/2007 | Harada et al. ................ 713/193 |
| 2007/0106564 A1 | 5/2007 | Matotek et al. |
| 2007/0106619 A1 | 5/2007 | Holdsworth |
| 2007/0125840 A1* | 6/2007 | Law et al. ..................... 235/379 |
| 2007/0152035 A1 | 7/2007 | Adams et al. |
| 2007/0158438 A1 | 7/2007 | Fukuda et al. |
| 2007/0171079 A1 | 7/2007 | Saito |
| 2007/0233615 A1* | 10/2007 | Tumminaro ................... 705/75 |
| 2007/0235539 A1 | 10/2007 | Sevanto et al. |
| 2007/0241180 A1 | 10/2007 | Park et al. |
| 2007/0278290 A1* | 12/2007 | Messerges et al. ........... 235/380 |
| 2007/0293155 A1 | 12/2007 | Liao |
| 2008/0011833 A1 | 1/2008 | Saarisalo |
| 2008/0048036 A1 | 2/2008 | Matsumoto et al. |
| 2008/0051122 A1 | 2/2008 | Fisher |
| 2008/0059375 A1 | 3/2008 | Abifaker |
| 2008/0093467 A1 | 4/2008 | Narendra et al. |
| 2008/0103972 A1 | 5/2008 | Lanc |
| 2008/0120129 A1 | 5/2008 | Seubert et al. |
| 2008/0207124 A1 | 8/2008 | Raisanen et al. |
| 2008/0233906 A1 | 9/2008 | Mitomo et al. |
| 2008/0245851 A1* | 10/2008 | Kowalski ..................... 235/375 |
| 2008/0250244 A1* | 10/2008 | Baentsch et al. ............. 713/168 |
| 2008/0270246 A1 | 10/2008 | Chen |
| 2008/0306828 A1* | 12/2008 | Chao ............................. 705/17 |
| 2009/0063312 A1 | 3/2009 | Hurst |
| 2009/0065571 A1 | 3/2009 | Jain |
| 2009/0065572 A1 | 3/2009 | Jain |
| 2009/0069049 A1 | 3/2009 | Jain |
| 2009/0069050 A1 | 3/2009 | Jain et al. |
| 2009/0069051 A1 | 3/2009 | Jain et al. |
| 2009/0069052 A1 | 3/2009 | Jain et al. |
| 2009/0070272 A1 | 3/2009 | Jain |
| 2009/0070691 A1 | 3/2009 | Jain |
| 2009/0070861 A1 | 3/2009 | Jain |
| 2009/0088077 A1* | 4/2009 | Brown et al. ................ 455/41.2 |
| 2009/0098825 A1* | 4/2009 | Huomo et al. ............... 455/41.1 |
| 2009/0108063 A1* | 4/2009 | Jain et al. ..................... 235/380 |
| 2009/0119190 A1* | 5/2009 | Realini .......................... 705/30 |
| 2009/0124273 A1 | 5/2009 | Back |
| 2009/0132418 A1 | 5/2009 | Morsillo et al. |
| 2009/0143104 A1 | 6/2009 | Loh et al. |
| 2009/0144456 A1* | 6/2009 | Gelf et al. ......................... 710/8 |
| 2009/0157936 A1 | 6/2009 | Goss et al. |
| 2009/0191812 A1 | 7/2009 | Teruyama et al. |
| 2009/0193491 A1 | 7/2009 | Rao |
| 2009/0199206 A1 | 8/2009 | Finkenzeller et al. |
| 2009/0199283 A1 | 8/2009 | Jain |
| 2009/0200371 A1* | 8/2009 | Kean et al. ..................... 235/379 |
| 2009/0261172 A1 | 10/2009 | Kumar et al. |
| 2009/0265544 A1 | 10/2009 | Moona et al. |
| 2009/0265552 A1* | 10/2009 | Moshir et al. ................ 713/168 |
| 2009/0287589 A1 | 11/2009 | Fivel |
| 2009/0298540 A1 | 12/2009 | Narendra et al. |
| 2009/0307139 A1 | 12/2009 | Mardikar et al. |
| 2009/0307142 A1 | 12/2009 | Mardikar |
| 2009/0319287 A1* | 12/2009 | Hammad et al. ................ 705/1 |
| 2010/0012721 A1 | 1/2010 | Jain et al. |
| 2010/0023449 A1 | 1/2010 | Skowronek et al. |
| 2010/0044444 A1 | 2/2010 | Jain et al. |
| 2010/0045425 A1 | 2/2010 | Chivallier |
| 2010/0062808 A1 | 3/2010 | Cha et al. |
| 2010/0063893 A1* | 3/2010 | Townsend ...................... 705/26 |
| 2010/0181377 A1 | 7/2010 | Chen et al. |
| 2010/0197224 A1 | 8/2010 | Lahdenniemi et al. |
| 2010/0203870 A1 | 8/2010 | Hubinak et al. |
| 2010/0205432 A1 | 8/2010 | Corda et al. |
| 2010/0213265 A1 | 8/2010 | Narendra et al. |
| 2010/0258639 A1 | 10/2010 | Florek et al. |
| 2010/0262503 A1 | 10/2010 | Florek et al. |
| 2010/0264211 A1 | 10/2010 | Jain et al. |
| 2010/0274726 A1 | 10/2010 | Florek et al. |
| 2010/0323617 A1 | 12/2010 | Hubinak et al. |
| 2011/0196796 A1 | 8/2011 | Florek et al. |
| 2011/0264543 A1 | 10/2011 | Taveau et al. |
| 2011/0282753 A1 | 11/2011 | Mullen et al. |

FOREIGN PATENT DOCUMENTS

| | | |
|---|---|---|
| CN | 1835007 | 9/2006 |
| CN | 1870012 | 11/2006 |
| CN | 101013903 | 8/2007 |
| CN | 101136123 | 3/2008 |
| CN | 101329801 | 12/2008 |
| CN | 101339685 | 1/2009 |
| CN | 101351819 | 1/2009 |
| DE | 10130019 A1 | 1/2003 |
| DE | 10 2005 026435 B3 | 12/2006 |
| DE | 10 2006 019628 | 10/2007 |
| DE | 10 2007 019272 A1 | 10/2007 |
| EP | 0704928 A2 | 4/1996 |
| EP | 601091 B1 | 12/1997 |
| EP | 1365451 A1 | 11/2003 |
| EP | 1450233 A2 | 8/2004 |
| EP | 1536573 | 6/2005 |
| EP | 1729253 | 12/2006 |
| EP | 1752902 A2 | 2/2007 |
| EP | 1752903 A2 | 2/2007 |
| EP | 1785915 A | 5/2007 |

(56) References Cited

FOREIGN PATENT DOCUMENTS

| | | |
|---|---|---|
| EP | 1943606 A2 | 7/2008 |
| EP | 2390817 | 11/2011 |
| FR | 0611189 | 9/1926 |
| FR | 0611190 | 9/1926 |
| GB | 2390509 A | 1/2004 |
| GB | 2424151 A | 9/2006 |
| GB | 2432031 A | 9/2007 |
| IE | 980562 | 2/2000 |
| JP | 2003-131808 | 5/2003 |
| JP | 2004-348235 A | 12/2004 |
| JP | 2005-284862 A | 10/2005 |
| JP | 2006-033229 | 2/2006 |
| JP | 2007-060076 A | 3/2007 |
| JP | 2007-166379 | 6/2007 |
| JP | 2007-304910 A | 11/2007 |
| JP | 2008-083867 A | 4/2008 |
| KR | 2002-0012738 | 2/2002 |
| KR | 2002-0051696 | 6/2002 |
| KR | 2002-0073106 | 9/2002 |
| KR | 2003-0005088 A | 1/2003 |
| KR | 2004-0012401 A | 2/2004 |
| KR | 2004-0060249 | 7/2004 |
| KR | 2004-0089800 A | 10/2004 |
| KR | 2005-0008622 A | 1/2005 |
| KR | 2007-0093133 | 9/2007 |
| SI | 22595 | 2/2009 |
| WO | WO 03/012717 A1 | 2/2003 |
| WO | WO 2005/057316 | 6/2005 |
| WO | WO 2005/086456 | 9/2005 |
| WO | WO 2006/009460 | 1/2006 |
| WO | WO 2007/076456 A | 7/2007 |
| WO | WO 2007/105469 | 9/2007 |
| WO | WO 2007/136939 | 11/2007 |
| WO | WO 2008/012416 A2 | 1/2008 |
| WO | WO 2008/041861 A | 4/2008 |
| WO | WO 2008/063990 | 5/2008 |
| WO | WO 2008/105703 A1 | 9/2008 |
| WO | WO 2009/014502 | 1/2009 |
| WO | WO 2009/087539 | 7/2009 |
| WO | WO 2009/118681 | 10/2009 |
| WO | WO 2010/011670 | 1/2010 |
| WO | WO 2010/023574 | 3/2010 |
| WO | WO 2010/032215 | 3/2010 |
| WO | WO 2010/032216 | 3/2010 |
| WO | WO 2010/041245 | 4/2010 |
| WO | WO 2010/044041 | 4/2010 |
| WO | WO 2010/097777 | 9/2010 |
| WO | WO 2010/122520 | 10/2010 |
| WO | WO 2010/128442 | 11/2010 |
| WO | WO 2010/131226 | 11/2010 |

OTHER PUBLICATIONS

"NFC Frequently Asked Questions," NFC for Customers, www.nfc-forum.org., Retrieved from the internet on Nov. 7, 2008, 5 pages.

Smart Card Alliance, "RF-Enabled Applications and Technology: Comparing and Contrasting RFID and RF-Enabled Smart Cards", Smart Card Alliance Identity Council, Jan. 2007, 7 pages.

Smart Card Alliance: "Proximity Mobile Payments: Leveraging NFC and the Contactless Financial Payments Infrastructure A Smart Card Alliance Contactless Payments Council White Paper", www.smartcardalliance.org, © Sep. 1, 2007, accessed Nov. 7, 2008, 10 pages.

Wikipedia, "Bluetooth", Wikipedia, The Free Encyclopedia, http://enwikipedia.org/wiki/bluetooth, accessed Apr. 8, 2012, 19 pages.

Wikipedia, "Cellular Frequencies" Wikipedia, The Free Encyclopedia, http://en.wikipedia.org/wiki/cellular_frequencies, accessed Apr. 8, 2012, 5 pages.

Madlmayar et al., "Management of Multiple Cards in NFC-Deivces", LNCS, 2008, 21 pages.

"Intelligent Mouse", IBM Technical Disclosure Bulletin, International Business Machines Corp., Thornwood, US, Feb. 1, 1995, 38(2), p. 463.

Finkenzeller (Ed.), "RFID-Handbuch: Grundlagen und praktische Anwendungen Induktiver Funkanlagen, Transponder und kontaktloser Chipkarten", Jan. 1, 2002, 225-231 (English abstract attached).

Balfe et al., "Augmenting Internet-Based Card not Present Transactions with Trusted Computing: An Analysis", Royal Holloway, University of London, Oct. 16, 2006, 25 pages.

Balfe et al., "e-EMV: Emulating EMV for Internet Payments with Trusted Computing Technologies", Royal Holloway, University of London, Oct. 31, 2008, 12 pages.

Khu-Smith et al., "Using EMV Cards to Protect E-Commerce Transactions", Information Security Group, Royal Holloway, University of London, 2002, 12 pages.

\* cited by examiner

US 8,799,084 B2

ELECTRONIC PAYMENT APPLICATION SYSTEM AND PAYMENT AUTHORIZATION METHOD

CROSS-REFERECE TO RELATED APPLICATIONS

This application is the National Stage of International Application No. PCT/IB2009/054101 filed Sep. 18, 2009 which claims the benefit of Slovak Application No. PP 5086-2008, filed Sep. 19, 2008, the disclosures of which are incorporated herein by reference in their entirety.

FIELD OF THE INVENTION

The invention refers to the electronic payment application system, concentrating on the payments realized through a mobile communication device, such as a mobile phone. The invention also describes the way the electronic payment is realized and authorized.

BACKGROUND OF THE INVENTION

The POS (point of sale) terminals are commonly used to process electronic payments realized through various payment cards. The POS terminals are connected to the payment processor. There exist payment systems which encompass a POS terminal operated by a merchant as a receiver of the payment.

The invention as in CN1450782 patent file describes a cooperation between a mobile phone and a POS terminal, however it does not deal with specific hardware implementation that would ensure the required security of payment applications. Also, there exist such implementations as in CN101136123, according to which the mobile phone can be used for password entering; however the mobile phone does not have the function of being a POS terminal itself.

The solution as in US2002/0147658 A1 describes some relations between the members of the electronic payment process; however it does not deal with the technical organization of individual elements. Other similar inventions as in WO 03/012717 A1 and US2007/0106564 A1 propose the way of organizing the elements, but they do not deal with specific technical implementation that would ensure the courses of payment operations to be secure enough. The invention as in WO 2008/105703 describes the participation of a mobile phone in the communication with a POS terminal; however it does not deal with the storage of payment card data in the mobile phone that would be secure enough. Some possibilities of communication between the POS terminal and the mobile phone are also described in other patent files such as IE 980562, U.S. Pat. No. 6,450,407 B1 and GB 2432031A. These, however, do not offer a configuration that could be comfortably used for securing the payment application.

Up-till present there are no such technologies known, that would enable to create personal portable POS terminals from commonly available devices, such as the mobile phones. The existing relations between the processor of electronic payments over the POS terminal and the banks could not be fully used to process payments from developing internet commerce, in case the internet shop itself was not equipped with the POS terminal.

SUMMARY OF THE INVENTION

The deficiencies mentioned are to a large extent eliminated by the electronic payment application system that consists of a secure element, a payment procession server, a mobile communication device with a display and a keyboard, such as a mobile phone as described by this invention. The subject matter of the mobile phone is based on the fact that the mobile communication device is equipped with a virtual POS terminal unit. The POS terminal functions are incorporated into a device that is at the sole disposal of the user, and not the merchant as it is known from existing solutions. The secure element with an encryption unit and a data storage unit can be placed within the mobile communication device, such as a mobile phone or it can be placed to a separate portable element in the form of a USB key. The USB key is connected to a personal computer through a USB connector. The mobile communication device also contains a removable memory card e.g. of the common microSD format. On the removable memory card there are at least two physically separate secure elements and the removable memory card is connected to the managing unit of the virtual POS terminal. The placement of the secure elements onto the removable memory card creates a precondition that enables to extend the possibilities of existing phones with a slot for insertion of the memory card. The important characteristic of the configuration described here is the hardware, physical separation of the secure elements; a solution which enables to store data of payment cards that belong to various financial institutions in a reliable, secure way. In the solution mentioned, the removable memory card can encompass various payment card's functions and according to the number of secure elements, it can even contain a secure area into which personal data or similar can be stored. The secure elements on the removable memory card are connected to a managing unit that switches the secure element into an active mode. The managing unit always activates the secure element with a chosen payment card data.

The device that carries the secure element with the encryption unit and with the data storage unit is adjusted in such a way to be able to connect to the payment procession server. On the payment processor side, the system and the related elements are organized in the same way as they are in the existing common payments realized through the POS terminals maintained by the merchants.

The encryption unit and the data storage unit form a secured part of the virtual POS terminal that is located in the secure element. Within the electronic payment application system here described, these units can be located on the printed circuit board of the mobile communication device's hardware or in a separate portable element that is adjusted for connection to a personal computer. In the first case, the transmission channel between the removable memory card and the virtual POS terminal's managing unit is the contact one and is created by conductive paths of the mobile communication device's hardware. In the second case the transmission channel between the separate portable element and the removable memory card is contactless. This basic configuration enables to create a POS terminal directly in each user's mobile communication device, such as a mobile phone. Using the system described, the user will be able to pay in a contactless way using his phone or a phone that communicates with his personal computer. Since this solution will cause the number of POS terminals to increase diametrically and since the POS terminals will not be operated only by the merchants, but basically by each user of a mobile phone, it would be suitable, if the payment communication between the virtual POS terminal and the payment procession server went first through an intermittent unit, the output of which will be sent to the payment procession server. Individual payments from a large number of individual virtual POS terminals will be the inputs for the intermittent unit. It can be supposed that one virtual POS terminal will have a smaller number of payments. The output from the intermittent unit will consist of the received payments' summary in a batch form. The output will be similar to the existing situation, when one POS terminal operates payment processes for various paying customers.

In one secure element on the removable memory card there is a one-time password creation unit and at least one other secure element on the removable memory card carries the payment's card data storage unit. The creation of the one-time password increases the security of the payment's authorization and solves the problem with an insufficient acceptability of the mobile phone's keyboard as the secure equipment for PIN entering.

In case the system has the secure element with the virtual POS terminal stored on a separate portable element, it is suitable if the transmission channel between the separate carrier element and the removable memory card is of the NFC type. In order to use even the mobile communication devices that do not have the NFC functionality in the payment processes as described in this invention, the removable memory card can be equipped with the NFC communication element, preferably even with the NFC antenna. The separate carrier element is equipped with the NFC communication element with an antenna. Using this kind of configuration, a mobile communication device, that originally was not equipped with the NFC communication element can be used since it obtains it by inserting the removable memory card into the device For easy manipulation when inserting the memory card with the NFC communication element into the mobile communication's slot, it is proper if the memory card also contains an antenna for the communication with the separate portable element. In principle, however, the NFC antenna can be placed even outside the removable memory card's body.

With respect to the supposed increase in usage of mobile communication devices for realization of payment processes, it is preferable, if the mobile communication device is equipped with a purpose key to run the electronic payment application. This key carries a symbol of the payment, for instance in the form of local currency sign.

The deficiencies in existing technologies are to a large extent eliminated by such a way of payment authorization in which the payment is instantly received by the payment receiver's account; especially the electronic payment realization method using a mobile phone in electronic purchases with these being processed by a remote payment procession server as described in this invention. The subject matter of this invention is based on the fact that the managing unit activates a corresponding secure element with a chosen payment card unit on the removable memory card, all in accordance with the user's choice. The user's payment card identification data are supplemented with the payment receiver's identification data and also with a one-time password that was generated from the entered PIN in the one-time password creation unit. All these data are electronically signed and subsequently the electronically signed data are sent either directly or through data storage unit to the payment procession server. It is preferable, if the electronically signed data are encrypted in the encryption unit within the virtual POS terminal before they are sent to the payment procession server.

The procession process as described above is different from existing processes on the POS terminal also in the fact that the POS terminal in its virtual form is not held by the receiver of the payment but on the contrary by the user paying for the goods and services. And so the payment is not accepted for the benefit of the given POS terminal's default account. For the reason given, the POS terminal processes also the receiver's identification data, according to which a corresponding account to which the payment should be sent to, is assigned on the payment procession server. The receiver's account itself can be an identification data. The electronically signed data are encrypted in the encryption unit that is incorporated into the secure part of the virtual POS terminal before being sent to the payment procession server.

After a successful payment, a unique transaction number confirming the realization of the payment is received from the payment procession server by the virtual POS terminal's managing unit in the mobile communication device.

On the beginning of the payment process, the virtual POS terminal's managing unit in the mobile communication device receives the payment receiver's identification data, so the payment could be routed correctly. Preferably, this data transfer can be processed through the payment procession server's cooperation with the payment receiver's internet shop. In case the separate portable element is used, it is preferable, if the transmission channel between the separate portable element and the removable memory card is of contactless type, preferably on the NFC communication platform.

In terms of preserving the statistical structure of data that are coming to the payment procession server and taking into the consideration that the number of POS terminals was substantially increased, it is suitable, if the electronically signed data are sent to the payment procession server over the intermittent unit, which centralizes connections to several virtual POS terminal's units.

The system and the method described enable comfortable and secure electronic payments. The user himself disposes of the virtual POS terminal that is capable of processing payments which are heading to different money accounts.

BRIEF DESCRIPTION OF THE DRAWINGS

The invention is explained in more detail in FIGS. 1 and 2.

REALIZATION EXAMPLES

Example 1

Figure 1:
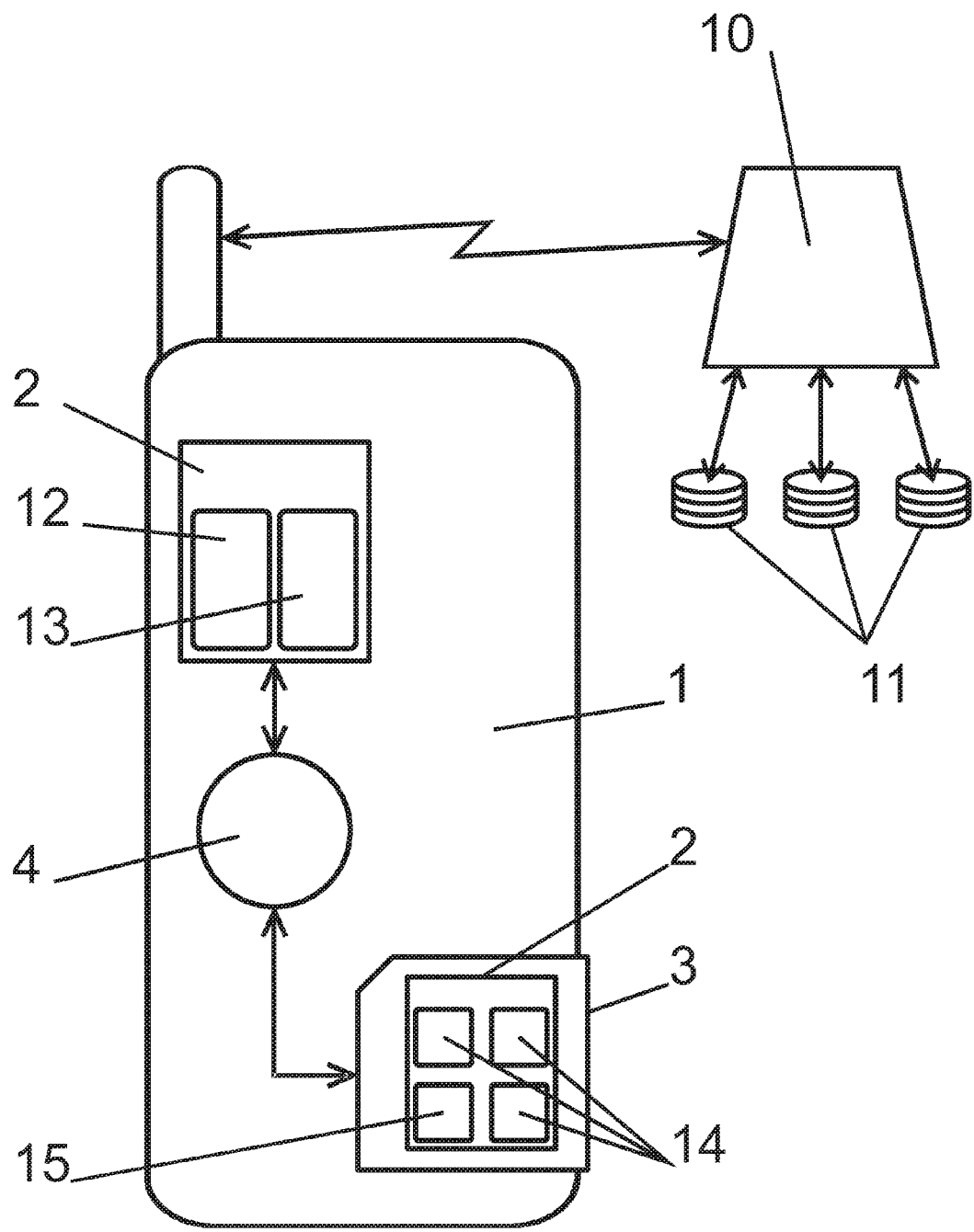
FIG. 1 illustrates an implementation scheme of a system with a mobile communication device which contains a secure element with an encryption unit and a data storage unit.
Figure 2:
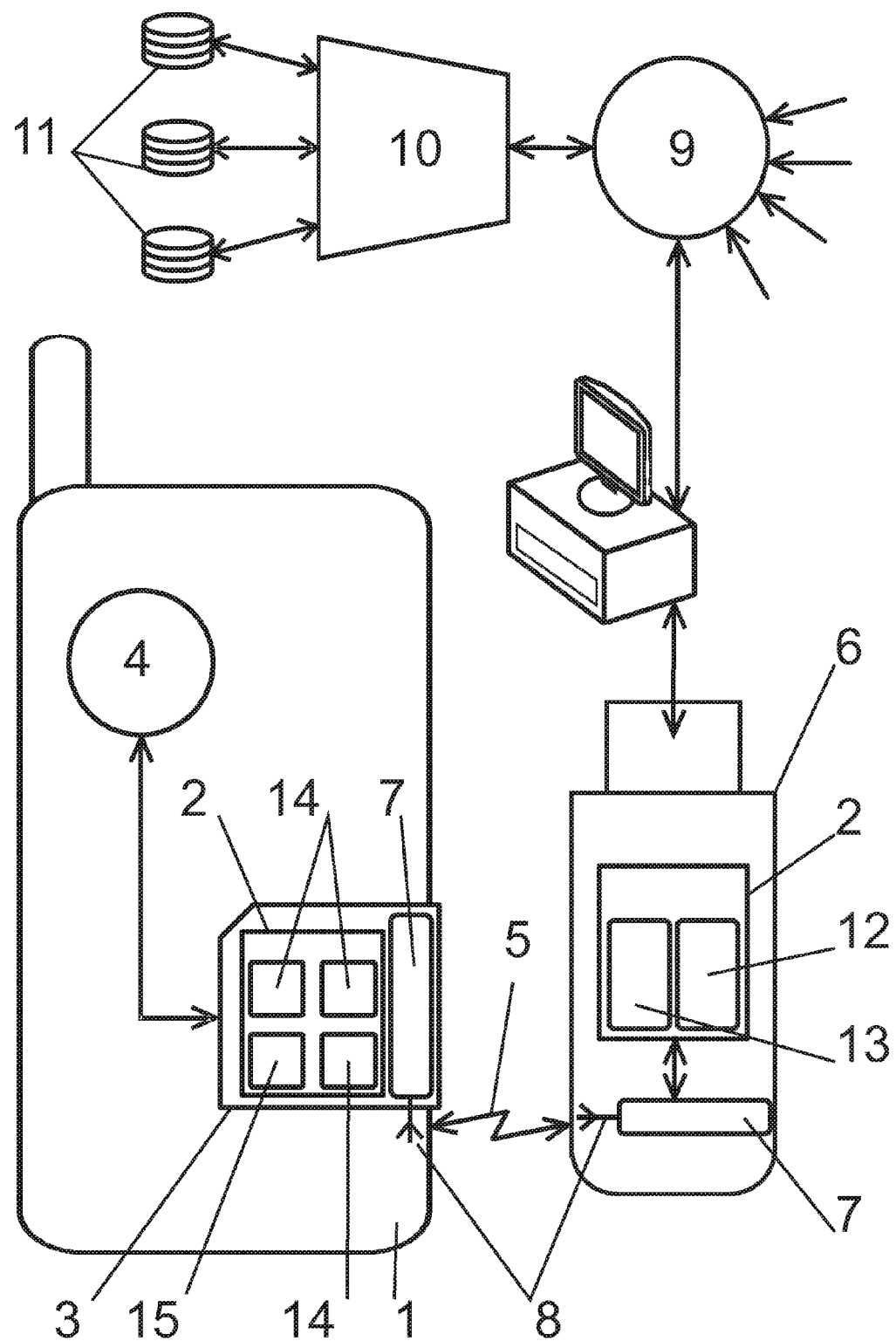
FIG. 2 illustrates a system with a separate portable element that is connected to a personal computer through an USB connector. An intermittent unit is placed in front of the payment procession server.

The system contains a mobile communication device 1 which is the NOKIA 6131 mobile phone. On the hardware board of the mobile communication device 1, there is a secure element 2. In this example, the mobile communication device 1 is also a device in which there is the secure element 2 with secured parts of the virtual POS terminal—an encryption unit 12 and a data storage unit 13. A removable memory card 3 of the microSD type is inserted into the mobile communication device's 1 slot. On the removable memory card 3 with standard parameters, there are stored four secure elements 2. Each of them is physically, hardwarely separate and independent. On the removable memory card 3 there is also a managing unite used to switch a corresponding secure element 2 into an active mode. The managing unit is responsible for exclusive activity of one secure element 2. In one secure element 2 on the removable memory card 3, there is a one-time password creation unit and on the other three secure elements 2 there are the payment card units 14. In this example they belong to three different providers of electronic payment procession, such as VISA, EC/MC, and LGM. The secure element 2 with a secured part of the virtual POS terminal contains the encryption unit 12 and the data storage unit 13. The removable memory card 3 is connected through its contact to the mobile communication device's 1 printed circuit board and through the conductive paths of the mobile communication device 1 to the virtual POS terminal managing unit 4. The communication between the removable memory card 3 and the secure element 2 with the secured part of the virtual POS terminal is ensured over this contact connection using the ISO7816 protocol. Over the public data network of the provider of the GSM services in the GPRS format, the mobile communication device 1 is adjusted so it can be connected to a remote payment procession server 10. The payment procession server 10 has the same configuration and functions as in the payment system with the standard, stable POS terminals. The payment procession server 10 is also connected to databases 11 of financial institutions, such as banks, which subtract the payments that were effectuated and associated with a specific client from the respective client's account.

The internet shop payment using a mobile communication device 1 with its own secure element 2 on the printed circuit board with the secured parts of the virtual POS terminal proceeds as follows. The user activates the payment application on the keyboard. The mobile communication device 1 is connected to the internet network. Depending on the data that are stored on the removable memory card's 3 separate secure elements 2, the user is offered to effectuate the payment through various payments cards. After the payment card was selected, the managing unit activates the corresponding secure element 2 on the removable memory card 3. After the user requests for the payment to be effectuated, the internet merchant as a receiver of the payment sends a request along with his bank data to the remote payment procession server 10. In response, the merchant receives the unique payment number that is displayed on the customer's display by the internet shop. The identification of the merchant's account is realized over the payment receiver's identification data, to which the payment procession server 10 joins the merchant's bank data. The identification of the merchant's account can also be realized by transmitting the merchant's complete bank identification data in the data flow.

After the request, the user enters the preselected PIN on the mobile communication device's 1 keyboard. This PIN is independent from the PIN that was assigned to the user by the issuer of the payment card; a PIN that is incorporated into the secure element 2 on the removable memory card 3. The PIN preselected by the user can be the same for all the payment cards of his, since it is not dependant on the payment cards' data. The application in the secure element 2 sends the data into the virtual POS terminal managing unit 4 in the same way as if it transmitted data into the standard stable POS terminal. After the correct PIN has been entered, on the display there appears a window with the authorization number. The user enters this authorization number into the internet form. The virtual POS terminal managing unit 4 sends the PIN to the one-time password creation unit 15, which creates one-time password which is then stored in the data storage unit 13. The virtual POS terminal managing unit 4 enters the one-time password and the transaction number into active, selected secure element 2 with the corresponding payment card unit 14, where the user's bank data are added to them. At this moment the data file that consists of the user's payment card identification data, the payment receiver's identification data and the one-time password, is signed. The virtual POS terminal managing unit 4 sends the data to the encryption unit 12 and being encrypted the data are sent over GPRS network to the payment procession server 10. There the signature is verified and the payment's card password is checked. The payment is processed as a payment effectuated through a virtual payment card over the virtual POS terminal and as a payment without PIN, since the PIN was already verified by the one-time password creation unit. In case the payment is authorized, an authorization code in the form of a unique transaction number is generated on the payment procession server 10. This coded is added to other payment data in the server's database. In the same time the unique transaction number is sent over the GPRS network to the virtual POS terminal managing unit 4 in the mobile communication device 1. In this example, the authorization code is displayed on the mobile communication device's 1 display; the user enters it into the corresponding window of the internet shop. The internet merchant, using his own transmission channel, sends the transaction coded and the authorization coded to the payment procession server 10. The internet merchant informs the user of the result of the verification. In case the verification was affirmative, the payment is finished by the command being sent from the payment procession server 10 to the corresponding database 11 of the financial institution. There the user's account is debited by the effectuated payment.

Example 2

In this example, a device that carries the secure element 2 with secured parts of the virtual POS terminal is a separate portable element 6 with a USB connector. The transmission channel 5 between the separate portable element 6 and the removable memory card 3 is contactless. The separate portable element 6 is equipped with a NFC communication element 7 with an antenna 8. The removable memory card 3 is equipped with a NFC communication element 7 including the NFC antenna 8. The mobile communication device 1 is equipped with a purpose key to run an electronic payment application. This key carries a EURO currency symbol on it.

The mobile communication device 1 contains a virtual POS terminal's managing unit that is connected to the removable memory card 3. On the removable memory card 3 there are three physically separate secure elements 2. The removable memory card 3 is connected to the secure element 2 on the separate portable element 6 over the virtual POS terminal's managing unit 4 and over the NFC communication. The separate portable element 6 is adjusted in such a way to be able to connect to a remote payment procession server 10 using a personal computer. The separate portable element 6 is connected to the personal computer by being inserted into the USB connector. In front of the payment procession server 10, there is the intermittent unit 9.

The intermittent unit 9 is maintained by the payment system manager that also ensures the connection between the intermittent unit 9 and the payment procession server 10. After the user activates the payment process, the internet merchant sends a requirement along with his bank data to the procession server. In response, he receives a unique transaction number, which the internet shop sends to the separate portable element 6 over USB port. By pressing the purpose key with the EURO sign, the user confirms the payment process. The virtual POS terminal's managing unit 4 in the mobile communication device 1 recognizes that it is a payment over a personal computer with a separate portable element 6 attached and proceeds in a different way then in the example 1. The virtual POS terminal's managing unit 4 requires the user to enter PIN for the one-time password to be generated and then stores the one-time password to the secure element 2 on the removable memory card 3. The virtual POS terminal's managing unit 4 requests the user to approach his mobile communication device 1 to a separate portable element 6. After this the transaction number is transmitted over NFC communication into the secure element 2 on the removable memory card 3. There the data are supplemented with the user's bank data. All the data are signed by the card and sent into the separate portable element 6, which sends them to the payment procession server 10. There the signature is verified, the password is checked and the payment is authorized. The payment is processed as a payment over a virtual card on the virtual POS and as a payment without PIN, since the PIN was already verified over the one-time password creation unit 15.

In case of the affirmative authorization, the payment procession server 10 generates the authorization code that is sent to the managing unit 4 in the mobile communication device 1, where it is displayed on the display or eventually even on the personal computer's monitor. The user enters, resp. copies the authorization code into the corresponding window of the internet shop. The internet shop sends the transaction code and the authorization code to the procession server to be verified and informs the user about the result.

INDUSTRIAL APPLICABILITY

The industrial usability is obvious. According to this invention it is possible to create and use electronic payment application system, in which the user uses a mobile communication device as a payment instrument. The user disposes of his own POS terminal that is incorporated into the mobile communication device or that is encompassed in the connection of this mobile communication device with a separate portable element.

LIST OF RELATED SYMBOLS

1—a mobile communication device
2—a secure element
3—a removable memory card
4—a virtual POS terminal's managing unit
5—a transmission channel
6—a separate portable element
7—a NFC communication element
8—an antenna
9—an intermittent unit
10—a payment procession server
11—a database belonging to a financial institution
12—an encryption unit
13—a data storage unit
14—a payment card unit
15—a one-time password creation unit

The invention claimed is:

1. An electronic payment applications system, comprising:
a remote payment processing server;
a mobile communication device comprising a display, a keyboard, a managing block for a virtual point-of-sale (POS) terminal, and a removable memory card; and
at least two physically separate secure elements that are connected to the managing block, wherein a secured part of the virtual POS terminal is located in one of the secure elements and is connected to the managing block,
wherein the secure elements are located on the removable memory card or in a separate portable element that is linked to the mobile communication device, and
wherein at least one of the mobile communication device and the separate portable element is adapted to be connected to the remote payment processing server.

2. The electronic payment applications system of claim 1, wherein the secured part of the virtual POS terminal includes an encryption block and a data storage block.

3. The electronic payment applications system of claim 1, wherein the managing block is adapted to switch the secure elements into an active mode.

4. The electronic payment applications system of claim 1, wherein the mobile communication device includes a printed circuit board, and the secure element with the secured part of the virtual POS terminal is on the printed circuit board, the system further comprising an electrically conductive transmission channel between the removable memory card and the secured part of the virtual POS terminal and the managing block formed by conductive paths in the mobile communication device.

5. The electronic payment applications system of claim 1, wherein the secure element with the secured part of the virtual POS terminal is located in the separate portable element, and the separate portable element is adapted to be connected to a computer, the system further comprising a contactless transmission channel between the separate portable element and the removable memory card.

6. The electronic payment applications system of claim 5, wherein the transmission channel between the separate portable element and the removable memory card is a near-field communication (NFC) channel.

7. The electronic payment applications system of claim 6, wherein the removable memory card is equipped with a first NFC element including a first antenna, and the separate portable element is equipped with a second NFC element including a second antenna.

8. The electronic payment applications system of claim 1, further comprising an intermittent block that centralizes connections to a plurality of virtual POS terminal blocks.

9. The electronic payment applications system of claim 1, wherein at least one of the secure elements on the removable memory card includes a one-time password creation block, and at least one other secure element includes a payment card block.

10. The electronic payment applications system of claim 1, wherein the mobile communication device includes a purpose key to run a direct debit application, and the key carries a payment symbol thereon.

11. A payment authorization method for realizing a payment to an internet shop via a mobile communication device, the payment being processed on a remote payment processing server, the method comprising:
activating, according to a user selection, a corresponding secure element having a payment card block on a removable memory card or separate portable element associated with the mobile communication device;
adding to payment card identification data associated with the user, a payment receiver's identification data and a one-time password generated from a personal identification number (PIN) entered in a one-time password block on the removable memory card;
the removable memory card electronically signing the payment receiver's identification data and one-time password; and
the removable memory card sending the electronically signed payment receiver's identification data and one-time password to the payment processing server.

12. The payment authorization method of claim 11, further comprising providing to a managing block of a virtual point-of-sale (POS) terminal in the mobile communication device a unique transaction number confirming that a payment was effectuated.

13. The payment authorization method of claim 11, further comprising providing the payment receiver's identification data to a managing block of a virtual point-of-sale (POS) terminal in the mobile communication device at the beginning of the payment process.

14. The payment authorization method of claim 11, further comprising encrypting the electronically signed payment receiver's identification data and one-time password in an encryption block in a secured part of a virtual point-of-sale (POS) terminal before the electronically signed payment receiver's identification data and one-time password are sent to the payment processing server.

15. The payment authorization method of claim 11, wherein a contactless transmission channel is defined between the separate portable element and the removable memory card.

16. The payment authorization method of claim 11, wherein the electronically signed payment receiver's identification data and one-time password are sent to the payment processing server via an intermittent block that centralizes connections to a plurality of virtual POS terminal blocks.

17. A mobile communications device for use in an electronic payment applications system, the mobile communication device comprising:

a managing block for a virtual point-of-sale (POS) terminal, and a removable memory card, wherein on the removable memory card there are located at least two physically separate secure elements that are connected to the managing block, a secured part of the virtual POS terminal is located in one of the secure elements and is connected to the managing block, and the mobile communication device is adapted to be connected to a remote payment processing server.

18. The mobile communication device of claim 17, wherein the secured part of the virtual POS terminal includes an encryption block and a data storage block.

19. The mobile communication device of claim 17, wherein the secure elements are connected to the managing block, and the managing block is adapted to switch the secure elements into an active mode.

20. The mobile communication device of claim 17, wherein at least one of the secure elements includes a one-time password creation block, and at least one of the secure elements includes a payment card block.

* * * * *